Dec. 22, 1970  G. C. WERLAU  3,550,042

WIDE BAND DIRECTIONAL COUPLER

Filed Nov. 18, 1966

INVENTOR
GLENN C. WERLAU

BY Henry L. Burkitt
ATTORNEY

United States Patent Office 3,550,042
Patented Dec. 22, 1970

3,550,042
WIDE BAND DIRECTIONAL COUPLER
Glenn C. Werlau, Susan Road, Peach Lake,
Brewster, N.Y. 10509
Filed Nov. 18, 1966, Ser. No. 595,425
Int. Cl. H01p 1/00, 5/4
U.S. Cl. 333—10                 4 Claims

ABSTRACT OF THE DISCLOSURE

A directional coupler for sampling energy traversing a main coaxial transmission line in a preselected direction including a first toroidal winding which is adapted to receive the inner conductor of the coaxial line therethrough to provide a first transformer wherein the inner conductor forms the primary winding and the toroidal winding forms the secondary winding. A second transformer including a second toroidal winding connected between the inner conductor and one end of a load device is provided. The primary winding of the second transformer is formed by the inner conductor of a coaxial transmission line having the same characteristics as the above noted transmission line. The inner conductor of this secondary transmission line extends through the second toroidal winding and is connected across the load device. The first toroidal winding is similarly connected across the load device. Impedance means is connected in series with the secondary inner conductor to provide energy dissipating means for dissipating energy flowing in a preselected direction in the main transmission line.

The present invention relates to high frequency electronic devices and more particularly to a directional coupler which couples to a coaxial transmission line.

At high frequencies, one or more electric waves travel on a transmission line or a wave guide in one direction from a generator to a load. In addition, there is often one more reflected waves which travel in the opposite direction. A directional coupler is a device which samples a small portion of the energy of the wave which is traveling in one direction or the other and converts it into an electric current. The amount of current, or sometimes of voltage, is directly proportional to the electric or magnetic component of the wave, in the case of an electromagnetic wave in a wave guide. A voltage or current meter, or other measuring device, is connected to the coupler and indicates the current or voltage flow. It is also possible to arrange such a device so that it samples both an original wave and the reflected wave.

There are various types of devices which have been utilized to couple a meter or other sampling device to the transmission line or wave guide. For example, one simple coupling system consists of holes in one wall of a main wave guide which couples it to a secondary wave guide positioned next to the wall with the holes. The magnetic and electric fields established in the secondary wave guide by the fields in the main wave guide provide a measure of the amplitude and direction of the electromagnetic waves in the main wave guide. One system which couples a transmission line to a wave guide utilizes a straight piece of wire within the wave guide whose ends are terminated by vertically extending transmission lines. Electric and magnetic coupling is established between the electromagnetic wave in the wave guide and the length of wire. The amount and direction of these couplings is an indication of the strength and direction of the electromagnetic waves in the wave guide. This general type of device is discussed in Terman and Petitte, "Electronic Measurements," McGraw-Hill 1953, pages 57–64.

There have also been various proposals for the coupling of a directional measuring device to a coaxial transmission line. One such device uses a first coaxial line as the primary line which carries the elecric wave. A secondary coaxial line is coupled to the primary line for the purpose of sampling the direction and amplitude of the waves carried on the primary line. The length of secondary coaxial line is one-quarter the wave length of a predetermined frequency carried on the primary line. This device is very limited in regard to the variations from the predetermined frequency that it can detect. In the case of relatively low frequencies, the line must be so long, for example, over 50 feet, which makes it cumbersome and expensive.

It is the objective of the present invention to provide a directional coupler which couples to a coaxial transmission line, which coupler is of relatively small size so that it may fit on a short length of the line.

It is a further objective of the present invention to provide such a directional coupler which has a broad wave band, that is, which is able to detect the direction and amplitude of waves over a wide frequency spread.

It is a further objective of the present invention to provide a directional coupler for a coaxial transmission line which coupler has a very low internal impedance so that it does not add to or subtract from the impedance of the overall system or distort the waves carried upon the line.

It is a further objective of the present invention to provide such a coupler that has a high degree of directivity; that is, which provides an output for waves in one direction and practically no output for waves in the opposite direction.

It is a further objective of the present invention to provide such a coupler which utilizes only a small portion of the total energy of the electromagnetic waves on the coaxial transmission line so that it is not necessary to use auxiliary amplifiers and so that transmission is not degraded.

In accordance with the present invention, the coaxial transmission line itself is used as the primary for the first of two toroidal coil transformers. In the first transformer the central conductor of the coaxial transmission line passes through, without any turns in the line, the hole in a doughnut or ring-shaped toroidal coil transformer. Preferably, the core of the coil is of a ferrite material, so that it may be utilized with high frequency transmission. A number of turns of wire, constituting the secondary coil of the transformer, is wound around the ring. A second transformer consists of a second ring-shaped, preferably ferrite, toroidal coil transformer. The winding of the coil is connected at one end to ground and at the other end to the central conductor of the primary coaxial line. A single wire from ground to a resistor passes through the hole of the second toroidal coil. The other end of the resistor is connected to the secondary coil of the first transformer.

A number of turns on the coil of the first transformer is equal to the number of turns on the coil of the second transformer, and they are both preferably of the same size. Consequently, the current which is induced in each of the secondaries of the transformers is adjusted so that they are exactly equal. The transformers are connected together and they are also connected to a load, such as a meter. A forward wave induces an electric current in the first transformer which is exactly of the same amplitude, polarity and duration as the current induced in the second transformer. There is no voltage across the resistor during the forward wave. The current from the first transformer is led to ground through the meter, which records the magnitude of the forward wave. In contrast, the backward wave induces a current in the first transformer which is exactly equal in magnitude, but opposite in polarity, to the current which the backward wave induces in the second transformer. The two currents, in effect, cancel each other out. The backward wave does not provide any energy to the meter. This directional coupler may indicate waves in the opposite direction by simply turning it around, so that the first transformer becomes the second and the second transformer becomes the first.

Other objectives will be apparent from the preferred embodiment which is described below, taken in conjunction with the accompanying drawings, in which.

Figure 1:
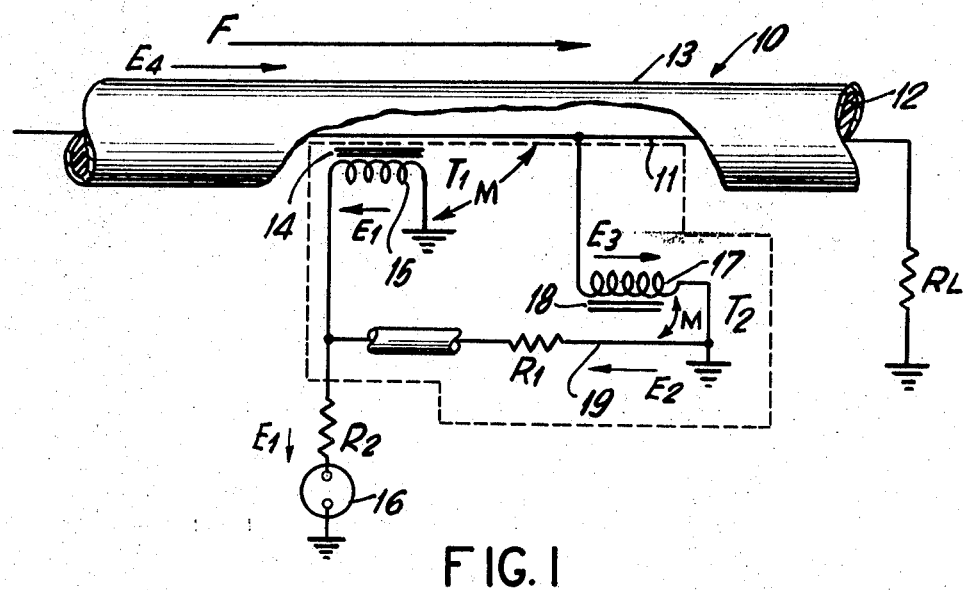
FIG. 1 is an equivalent circuit of the directional coupler showing its action on the forward wave.

In the system shown in FIG. 1, a forward electric wave in the direction of arrow F is generated on coaxial transmission line 10. The line 10 includes an inner conductor 11, an insulator 12, and an outer conductor 13. The inner conductor terminates in a load, represented by resistance $R_L$.

The inner conductor 11 of line 10 is utilized as the primary of transformer $T_1$. The core 14 of the transformer $T_1$ is preferably of ferrite so that it is responsive at high frequencies. The secondary winding 15 of transformer $T_1$ has one of its ends grounded and its other end connected to electrical meter 16 through resistance $R_2$. The forward wave in the direction F has an electrical component $E_4$ which induces a magnetic field which is transmitted by core 14 to induce a current and voltage $E_1$ in coil 15. The magnitude of the induced voltage $E_1$ and current is directly proportional to the magnitude of the electrical component $E_4$ of the wave on line 10.

A second transformer $T_2$ has a coil 17 as its primary. One end of coil 17 is connected to conductor 11. The core 18 of the second transformer $T_2$ is preferably of the same size and material as the core of transformer $T_1$. The secondary of transformer $T_2$ is the central conductor 19 of a separate length of coaxial cable 10b. One end of conductor 19, the same size as conductor 11 is connected to ground and the other end is connected to resistance $R_1$.

A forward wave F on line 10 is conducted, in its electrical component $E_3$, through primary winding 17. This induces a magnetic flux in core 18 which induces a voltage and current $E_2$ in the secondary 19.

The current from $T_1$ flows through resistance $R_2$ and is recorded by meter 16. No current flows through $R_1$ since no difference in potential exists across it. On the forward wave F the direction (polarity) of $E_1$ and $E_2$ is the same.

Figure 2:
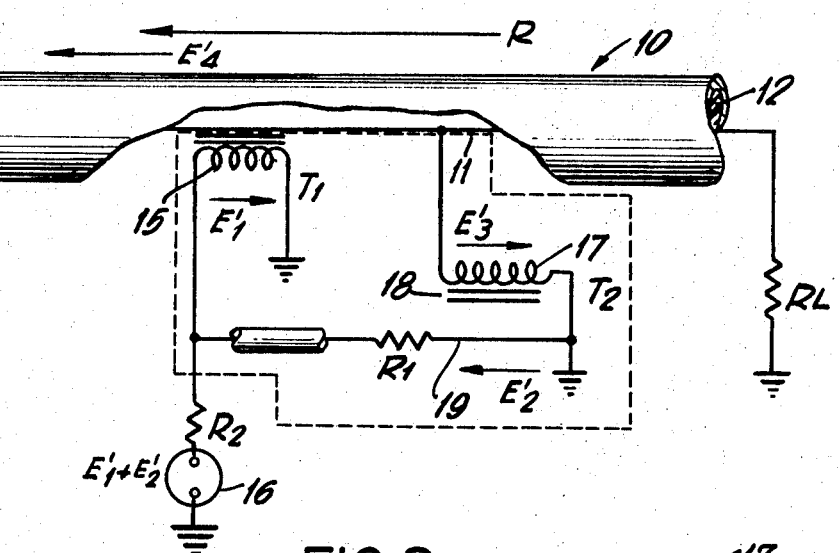
FIG. 2 is an equivalent circuit of the directional coupler showing its action on the reflected (backward) wave.

The circuit of FIG. 2 is the same as that of FIG. 1 except that the line 10 now has a reflected (backward) wave in the direction of arrow R. In this case the electric component $E'_4$ of the reflected wave induces an electric current $E'_1$ in secondary 15 of transformer $T_1$ and an equal current $E_2$ in magnitude in the secondary 19 of transformer $T_2$. However, in this case the polarities of $E'_1$ and $E'_2$ are opposite and they cancel each other to a zero net effect in resistance $R_2$. The coupler, in its reflected wave operation, dissipates the energy extracted from the waves on line 10 in resistance $R_1$. The meter 16 registers the lack of a current.

Figure 3:
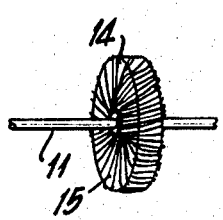
FIG. 3 is a perspective view of the primary transmission line and the first toroidal coil transformer.

In the construction shown in FIG. 3, transformer $T_1$ consists of a ferrite core 14 of ring or doughnut shape around which is wound a plurality of turns of wire constituting coil 15. The wire is wound so that its turns lie along the radius of the core. The inner conductor 11 of the coaxial transmission line 10 passes through the hole in the ring-shaped core 14. Preferably, the size of the conductor and of the coil are such that there is a relatively tight fit between the conductor 11 and wires inside the hole of the core.

Figure 4:
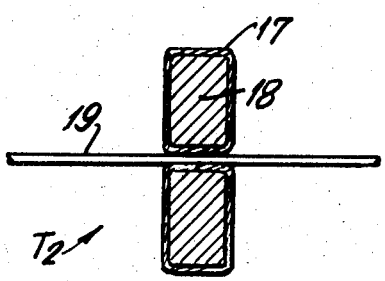
FIG. 4 is a side sectional view of the second toroidal coil transformer.

The transformer $T_2$, as shown in FIG. 4, is of the same construction and preferably of the same size as transformer $T_1$ and has the same number of windings. In this case, however, the secondary of the transformer $T_2$ consists of a short piece of the bare wire conductor 19 which is within the hole of the doughnut shaped core 18. The primary winding consists of a number of turns of wire which are wound around the core 18. The number of turns on the coil $T_2$ is equal to the number of turns on the coil $T_1$.

The directional coupler of the present invention is preferably formed with its connections and two transformers in a covered and potted box. The enclosure of that box is indicated by the broken lines on FIGS. 1 and 2. In one example, the coupler constructed according to the present invention was less than 2 x 1 x 1 inches in size; had a band width of 1 to 1000 mc.; and used 50 ohm coaxial line adding less than one-half ohm to the system; and had a net energy loss of about 0.2 db at certain frequencies.

In one alternative of the present invention, a single transformer is used. The transformer is of the same type as $T_1$ and $T_2$, shown in FIGS. 3 and 4. The transformer is placed directly on the coaxial transmission line. The line conductor is the primary and goes directly through the hole. The transformer acts as a sampler and gives the magnitude of the total additive electrical energy of the forward and backward wave, without an indication as to directivity. One end of the secondary of the transformer is grounded and its other end terminates in a meter.

As an alternative, the device may be made into a four-port device by the addition of a third transformer which is coupled to the resistance $R_1$.

Other embodiments and arrangements may be made in the present invention within the scope of the subjoined claims.

I claim:

1. A directional coupler for sampling energy traversing a main coaxial transmission line in a preselected direction wherein said main coaxial transmission line includes an inner conductor and an outer conductor, said coupler comprising a first toroidal winding having an opening adapted to receive the inner conductor of said main coaxial transmission line therethrough, whereby the inner conductor of the main transmission line and said toroidal winding provide respective primary and secondary windings of a first transformer; a load device; means connecting said first toroidal winding in a circuit path with said load; a second toroidal winding having an opening therethrough; means connecting said second toroidal winding between the inner conductor of the main coaxial transmission line and one end of said load; a secondary coaxial transmission line having an inner conductor received through said opening in said second toroidal winding, whereby said second toroidal winding and said inner conductor of said secondary transmission line provide respective primary and secondary windings of a second transformer; said secondary coaxial transmission line having the same characteristics as the main coaxial transmission line; an impedance means connected in series with said inner conductor of said secondary transmission line for dissipating energy flowing therethrough, and means connecting the series circuit of said inner conductor of said secondary transmission line and said impedance means across said load.

2. A directional coupler as in claim 1, in which said impedance means comprises a resistor.

3. A directional coupler as in claim 1, in which said load device comprises an indicating device.

4. A directional coupler as in claim 1, and a resistor connected in series with said load device.

References Cited

UNITED STATES PATENTS

| | | | |
|---|---|---|---|
| 2,724,806 | 11/1955 | Tillotson | 333—11XR |
| 2,734,169 | 2/1956 | Douma | 333—10XR |
| 3,048,798 | 8/1962 | Simons | 333—10 |
| 3,223,954 | 12/1965 | Mateer | 333—78XR |
| 3,283,265 | 11/1966 | Ringelhaan | 333—78XR |

FOREIGN PATENTS

| | | | |
|---|---|---|---|
| 740,448 | 11/1955 | Great Britain | 333—24 |

HERMANN K. SAALBACH, Primary Examiner

M. NUSSBAUM, Assistant Examiner

U.S. Cl. X.R.

333—97